May 19, 1925.  1,537,963
F. O'NEILL
TAKE-OFF MECHANISM
Filed Oct. 17, 1921  2 Sheets-Sheet 1
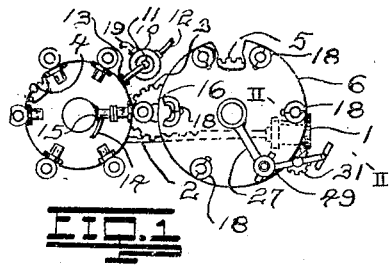
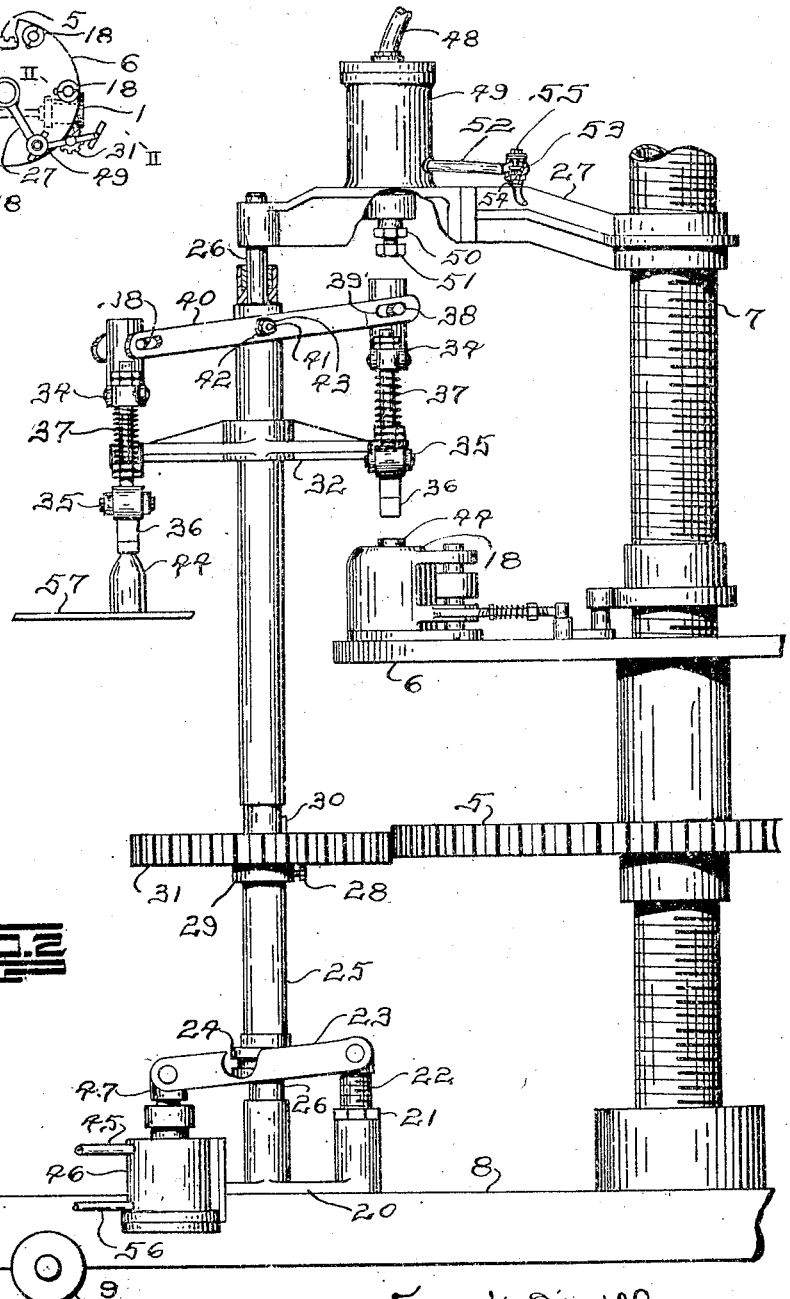
Frank O'Neill
INVENTOR
BY Geo E Kirk
ATTORNEY

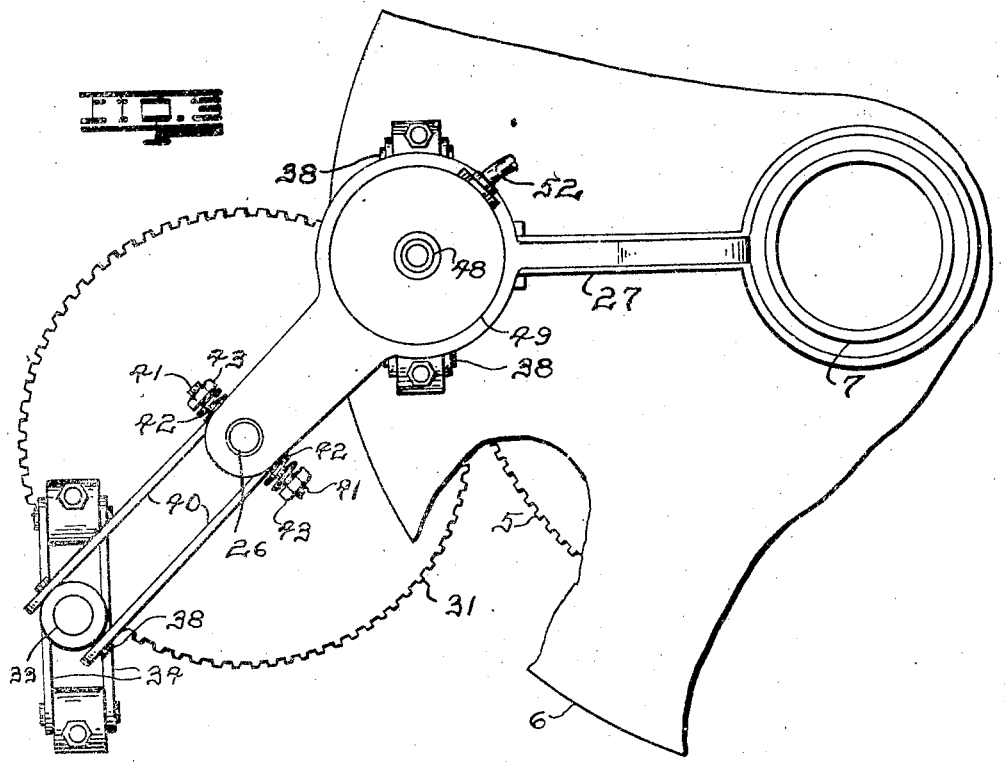

Patented May 19, 1925.

1,537,963

UNITED STATES PATENT OFFICE.

FRANK O'NEILL, OF TOLEDO, OHIO.

TAKE-OFF MECHANISM.

Application filed October 17, 1921. Serial No. 508,320½.

*To all whom it may concern:*

Be it known that I, FRANK O'NEILL, a citizen of the United States of America, residing at Toledo, Lucas County, Ohio, have invented new and useful Take-Off Mechanisms, of which the following is a specification.

This invention relates to glass handling machines.

This invention has utility when incorporated in glass bottle manufacturing installations, and more particularly in the mechanism for removal of the finished bottles from the blowing machine, while still quite hot.

Referring to the drawings:

Fig. 1 is a plan view, on a reduced scale, showing a general arrangement of a two-column glass bottle machine, say of the O'Neill type embodying a blank table, a blow table, and the take-off of this invention;

Fig. 2 is a view on the line II—II, Fig. 1, showing the take-off in position to move down to engage an article of ware;

Fig. 3 is a plan view of the take-off of Fig. 2;

Fig. 4 is a detail view of the open gripping means of Fig. 2; and

Fig. 5 is a detail view of the closed gripping means of Fig. 2.

Main power cylinder 1 is provided with rack carrying piston rod 2 reciprocable to effect in one direction of its travel intermittent rotation of intermediate driving gear 3 in mesh with blank mold table driving gear 4 and blow mold table driving gear 5. This blow mold table driving gear 5 is mounted below mold table 6, and the gear and table rotate simultaneously in their step by step travel of 60° on column 7 of this glass forming machine, mounted on platform or base 8 carried by rollers 9. As the piston rod 2 completes its drive stroke, cylinder 10 has piston rod 11 actuated by power air in line 12, to thrust bar 13 into blank table locking position. As the blank table is thus positively locked against rotation in the idle or recover stroke of the driving piston 2, this locking through the intermediate gear 3, also serves to lock the blow table 6 from rotation. As the two tables have come to rest, and the blank and blow molds are open at the intermediate transfer station of rest, air line 14 to cylinder 15, effects shifting of neck finish 16 with a blank from blank mold open sections 17 into finish mold sections 18 to be closed thereabout. When the piston rod 2 has completed its return or idle stroke it coacts to supply power fluid by way of line 19 to the cylinder 10, reversing the stroke of the piston rod 11, and thereby releasing the lock bar 13 from blank table holding position.

The take-off device of this disclosure may be mounted upon the glass bottle machine base 8, and be controlled by the power and drive mechanisms therefor in a simple manner to insure synchronism of take-off with the machine operation.

Mounted upon the machine base 8 is an auxiliary base 20 having an upstanding tubular portion providing a seat for a nut 21 which may be rotated for adjusting fulcrum pin support 22 of lever 23 engaging collar 24 below sleeve 25 guided by column 26 fixed with the auxiliary base 20. From the column 7 of the blow table of the machine, extends brace 27 to anchor the top of this take-off column 26 in an upright position parallel to the column 7. Set screw 28 of collar 29 on the sleeve 25, engages spline 30 mounting gear 31 in position to remain in mesh with the gear 5 throughout the range of vertical reciprocation of the sleeve 25 on the column 26. The gear 31 is accordingly connected to effect simultaneous rotation or take-off shifting of the sleeve 25 with the step by step shifting of the blow table 6. With six blow molds 18 in the annular series on the blow table 6, the step by step travel of the blow table is 60°, while with a two-arm take-off as herein disclosed, it is desirable that the sleeve 25 rotate 180° as the table 6 shifts the 60°. To this end, the gear 31 is proportioned for three to one travel as to the gear 5.

Fast with the sleeve 25 of the take-off column, and above the top of the sectional blow molds 18, is a bracket 32, having two arms. This bracket 32, terminally carries upstanding guide pins 33, upon each of which is reciprocable a cross-head 34. The bracket 32 in alignment below the guide 33, carries fulcrum pin 35 for gripping levers 36. The pair of gripping lever jaws 36 is connected through the crosshead 34 by yieldable links 37. Pins 38 carried by the crossheads 34, coact with slots 39 in arms 40 mounted by fulcrum pins 41 to the sleeve 25, to rock as a walking beam toward and from the bracket 32. Springs 42, adjusted by nuts 43, permit such setting of frictional holding at the fulcrums 41 that the arms 40 do not tend to shift from any position in which placed during the operation of the machine.

By using the blow table driving gear for the take-off shifting of the take-off device, with one third the number of teeth in the gear 31 than are in the gear 5, there results a placing of the column 25 in a position somewhat shorter than the radial distance of the guide 33 from the column 25, plus the radial distance of the centerline of the mold 18 from the column 7. The radial line from the column 7 toward the column 25 is about 18° back of take-off position for the blow molds. When the blow table 6 reaches a position of rest, with an article of ware 44 therein, the machine opens the blow molds.

The take-off may be considered with jaws 36 open as in Fig. 4 above the open mold 18 (Fig. 2). Power air from the line 12, by way of branch line 45 to cylinder 46, through piston rod 47, pulls the lever 23 downward, and with it the collar 24, sleeve 25, and thus lowers the jaws 36 toward the article 44, as the lock bar 13 comes into holding action at the blank table 4. The adjustment permitted by the nut 21 allows such changes of position for downward shifting as may be necessitated for different sizes and shapes of ware to be engaged.

Closely timed with this lowering of the sleeve 25, is the housing of the crosshead 34, as to guide 32 for operating the gripping means 36. Power air from the line 14 by way of branch line 48 to cylinder 49 carried by the brace 27. This action of the power air in the cylinder 49 serves to lower piston rod 50 having adjustable head 51 to abut the crosshead 34, to slide this crosshead 34, above the ware 44 at the open blow mold 18, downward toward the ware as directed by the guide 33. This movement, through the yieldable links 37 effects a yieldable engagement of the ware 44 by the gripping jaws 36. A desired lag may occur in this depressing of the crosshead 34 by the grip operating device, by having line 52 from the lower portion of the cylinder 49 extend to valve 53 having scored seat 54 and adjusting nut 55. The exhausting of the air from the lower side of the piston in the cylinder 49 may thus be so slowed up that the jaws 36 may not shatter a bottle neck by too rapid or positive swinging theretoward, even should the jaws come to this gripping position almost simultaneously with the coming to rest of the table 6.

As the line 48 has its power supplied by the transfer shifting of a blank from the blank table to the blow table accompanied by the immediate return of the neck finish, the line 48 is quickly exhausted of its power air. As the transfer operation is completed and the operations at the various positions of rest have transpired, the power air in the line 19 shifts the lock bar 13 to release position. Branch line 56 from the line 19 position to the lower portion of the cylinder 46 shifts to the lower portion of the cylinder 46 shifts the piston rod 47 upward, and through the lever 23, collar 24, and sleeve 25, lifts the gripped ware 44 from the mold 18 just before the table 6 starts its next 60° shift, for the piston rod 2 at once begins its next driving stroke. Accordingly, with this shifting of the table 6, the sleeve 25 is rotated 180° in taking the article of ware from the blow mold 18 and suspending it over conveyor 57.

As there is repetition of the lowering of the sleeve 25, and depressing of the other crosshead 34 now at the position over the opening mold having an article of ware 44 therein, the action of the grip operating means in thrusting the head 51 against the crosshead 34, to effect closing of the jaws 36 about the bottle 44 in the next mold 18, is simultaneously transmitted through the arms 40 of the walking beam to open the jaws 36 holding the article of ware 44 at the conveyor 57, which article has been lowered down theretoward by the lowering of the sleeve 25. The article of ware which was taken from the machine is accordingly deposited on the conveyor pick before another article is being picked up at the machine. As the line 48 is exhausted of power air before the step operation of the table is to occur, there is a permitted lifting of the head 51, by the upward travel of the sleeve 25. And this upward shifting of the head 51 does not rock the walking beam, for the springs 42 are adjusted sufficiently to take care of this situation. This lifting of the sleeve 25 accordingly resets the grip operating means.

By providing a plurality of take-off arms to the take-off as herein, in proportion to such number of arms, the speed of take-off shifting and release may be slowed up, a factor in conserving ware and permitting speeding up of the other machine operations wherein the ware is fully supported.

What is claimed and it is desired to secure by Letters Patent, is:

1. A machine embodying a table, a sectional mold carried by the table, an intermittent drive for rotating the table to a position of rest for the mold, mold opening means, a take-off embodying ware gripping means, a first gear rotatable with the table, a second gear in mesh with the first gear drive for bringing the gripping means to said mold position of rest, actuator mechanism for lowering the gripping means toward the opening mold, additional means coacting to effect gripping of the ware by the gripping means, and control means for reversing the actuator mechanism to lift the gripped ware, said connections coacting to shift the gripping means and ware held thereby away from said additional means.

2. A take-off for glass forming machines embodying a plurality of horizontal axis ware engaging arms; a drive for shifting the arms from ware receiving position; at a station of rest; piston and cylinder operating means for effecting ware engagement by an arm in ware receiving position, from which operating means and position said ware carrying arm is shiftable by said drive; and control means for resetting the operating means clear of the succeeding ware engaging arm.

3. A glass forming machine including a rotary table, a column for the table, a gear carried by the table, and a mold carried by the table, and a take-off for removing ware from the table, said take-off embodying a column spaced from the machine column, a gear on the take-off column in mesh with the machine gear, and ware engaging arms mounted on the take-off column to be shifted by said gears in removing an article of ware from the mold.

4. A glass forming machine including a column, a table and gear concentric of said column, molds carried by the table, a drive for shifting said table and gear, and a take-off embodying a column, a brace between said columns, a pair of arms mounted on the take-off column, a gear concentric with the take-off column in mesh with the table gear, and connected to actuate said arms, and ware gripping means depending from the arms.

5. A glass forming machine including a column, a table concentric of said column, a gear fixed with the table, molds carried by the table, an intermittent drive for the gear, and a rotary take-off for ware from the table molds, said take-off being axially parallel to the column and including a gear in mesh with the table gear and in a common plane therewith.

6. A take-off embodying a column, a walking beam depending from the column, gripping means terminally carried by the walking beam ends and stationary control means including a member reciprocable over an end of the walking beam for depressing said end of the walking beam.

7. A take-off embodying a column, a walking beam fulcrumed on the column, an arm from the column, horizontal axis levers connected to the arm and controllable to swing the gripping means as actuated by said walking beam, and controllable reset plunger means eccentric of the column shiftable relatively to the column and beam for raising and lowering the gripping means.

8. A take-off embodying a rotary column providing a station of rest, a walking beam fulcrumed on the column, gripping means terminally depending from the walking beam, a piston and cylinder device for actuating the gripping means, and control means to reset the device.

9. A take-off embodying a column, a walking beam fulcrumed on the column, gripping means terminally depending from the walking beam, movable means shiftable relatively to the column and beam for closing the gripping means at one terminus of the walking beam and simultaneously opening the gripping means at the other terminus of the walking beam, and control means for resetting said device.

10. A take-off embodying a column, a walking beam fulcrumed on the column, gripping means terminally depending from the walking beam, a column carried bracket providing guide means for the gripping means, a grip operating plunger shiftable relatively to the column and beam coacting to rock the walking beam on its fulcrum and shift the gripping means as to the guide means, and control means for resetting said plunger.

11. A take-off embodying a column, a sleeve for the column, a bracket carried by the sleeve, an arm over the bracket and pivoted to the sleeve, a guide carried by the bracket, gripping means depending from the arm and directed by the guide, means for raising and lowering the gripping means by shifting the sleeve as to the column, and a plunger downwardly shiftable as to said sleeve for closing the gripping means.

12. A take-off embodying a column, a sleeve for the column, means for shifting the sleeve as to the column, a bracket carried by the sleeve, an arm over the bracket and pivoted to swing on the sleeve toward the bracket, arm swinging means mounted eccentric of the column, a guide carried by the bracket, gripping means including a pair of depending jaw levers pivoted to the bracket, a crosshead movable along the guide, and means for rotating the sleeve to shift the gripping means therewith independently of the arm swinging means.

13. A take-off embodying a column, a sleeve for the column, a bracket carried by the sleeve, an arm pivoted upon the sleeve to swing toward the bracket, a guide carried by the bracket, gripping means including a pair of jaw levers pivoted to the bracket, a crosshead movable along the guide, yieldable links from the crosshead for actuating the levers, means for shifting the sleeve, arm, bracket and gripping means as to the column, and grip operating means mounted independently of said sleeve.

14. A take-off embodying a bracket providing a guide, an arm pivoted to swing toward the guide, gripping means carried by the arm and directed by the guide, bracket and arm lowering means for positioning the gripping means, bracket and arm rotating means for effecting the take-off travel of gripping means held ware from a station of rest, a plunger mounted independently of shifting by said take-off travel, for giving additional ware gripping operation of said gripping means, and control means for moving said plunger into reset position.

15. A glassware forming machine embodying a first column, a rotary table and gear mounted for simultaneous intermittent rotation on said column, molds carried by said table, and a take-off comprising a gear in mesh with said table column gear, a second column, a brace between the columns, gripping means for ware, a pivoted controlling arm and directing bracket mounting the gripping means for take-off shifting simultaneously with table operation as actuated from said gears, means for lowering said mounting and gripping means, and brace carried means movable for operating the gripping means.

In witness whereof I affix my signature.

FRANK O'NEILL.